United States Patent

[11] 3,584,520

| [72] | Inventor | August H. Borman<br>Livonia, Mich. |
|---|---|---|
| [21] | Appl. No. | 880,784 |
| [22] | Filed | Nov. 28, 1969 |
| [45] | Patented | June 15, 1971 |
| [73] | Assignee | General Motors Corporation<br>Detroit, Mich. |

[54] TRANSMISSION
4 Claims, 1 Drawing Fig.

[52] U.S. Cl. .................................................. 74/763,
74/688
[51] Int. Cl. ..................................................F16h 57/10,
F16h 47/08
[50] Field of Search...........................................74/759, 763

[56] References Cited
UNITED STATES PATENTS

| 2,671,359 | 3/1954 | Scheiter ....................... | 74/763 X |
| 2,725,762 | 12/1955 | Hettinger, Jr. et al. ....... | 74/688 |
| 3,287,995 | 11/1966 | Leonard et al................ | 74/763 |
| 3,314,307 | 4/1967 | Egbert........................... | 74/763 X |

*Primary Examiner*—Arthur T. McKeon
*Attorneys*—W.E. Finken, A.M. Heiter and R.L. Phillips

ABSTRACT: A vehicle transmission having a hydrodynamic torque converter and planetary gearing combined with three clutches, three brakes, two one-way brakes and a one-way clutch to provide four forward drives including an overdrive and also to provide a reverse drive.

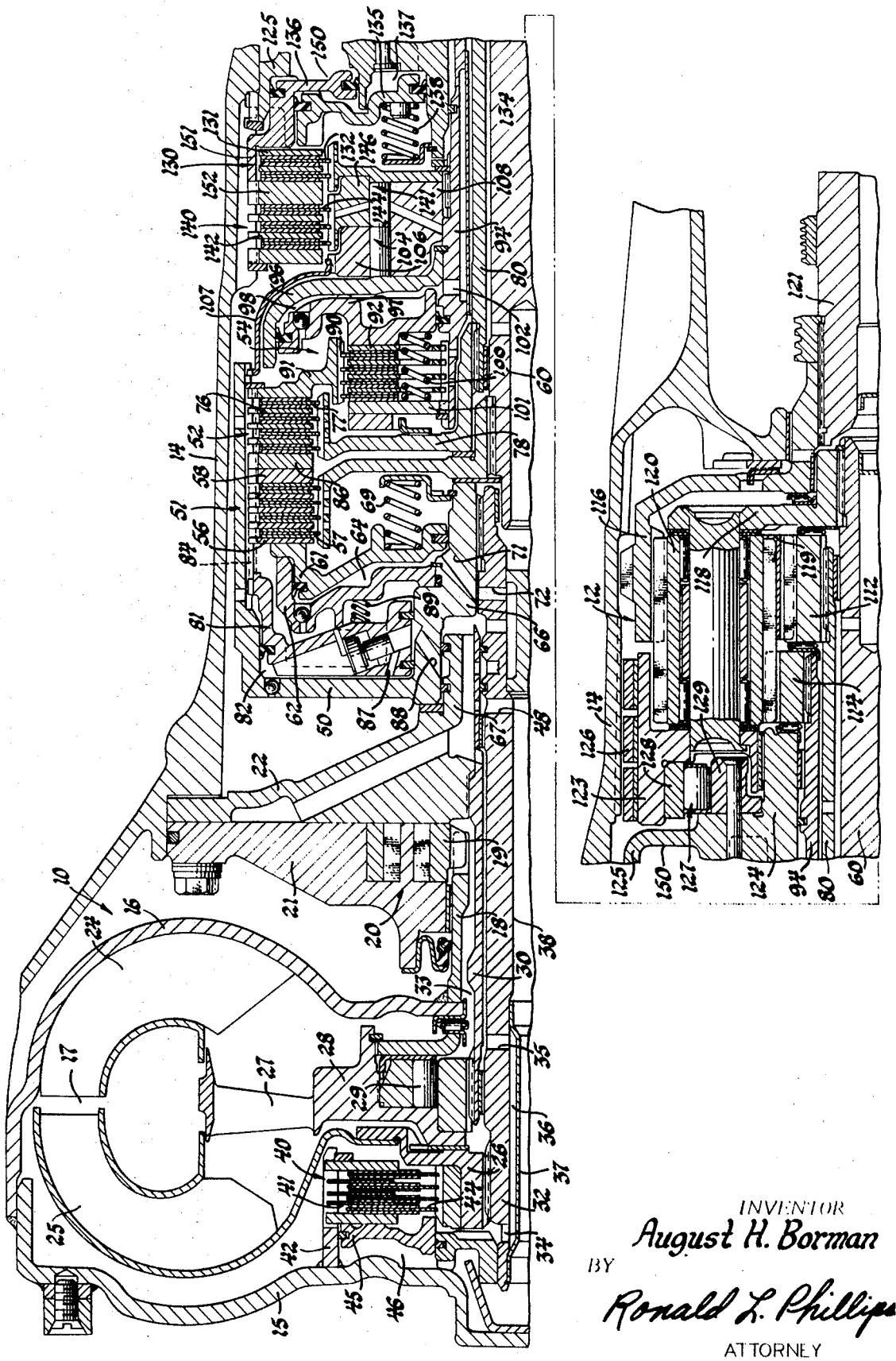

TRANSMISSION

This invention relates to transmissions and more particularly to vehicle transmissions affording a plurality of drives including an overdrive.

It is well known that a vehicle transmission with overdrive provides for economical vehicle cruising. From a cost standpoint, it is desirable that the overdrive be afforded with minimum gearing.

The present invention is embodied in a transmission generally comprising a hydrodynamic torque converter and planetary gearing. The planetary gearing is combined with drive establishing devices to provide four forward drives, neutral and a reverse drive. The converter has a lockup clutch which may be engaged at a predetermined output speed in the forward drives. For the first and lowest speed range forward drive, a clutch is engaged to connect the converter's turbine to drive a first sun gear in the planetary gearing. This sun gear meshes with a short planet pinion which in turn meshes with a long pinion. The long pinion meshes with a second sun gear and also with a ring gear which is connected to the transmission's output shaft. Both the long and short planet pinions are carried on a carrier which is held against backward rotation by a one-way brake so that with this clutched turbine drive to the first sun gear the output shaft is driven in the same direction as the turbine driven sun gear and at a reduced speed. For engine braking in this drive, a brake is engaged to hold the carrier against rotation in the forward direction. For the second forward drive, the previously engaged clutch remains engaged to transmit drive to the first sun gear and a brake is engaged so that another one-way brake is effective to hold the second sun gear against backward rotation. With this latter sun gear held against backward rotation, compound gearing action drives the transmission output shaft in the forward direction in a higher speed range. Engine braking in the second forward drive is made available by engaging a brake to hold the second sun gear against forward rotation. The third forward drive is provided by retaining the clutched turbine drive to the first sun gear and engaging another clutch which connects the turbine to also drive the carrier. This locks up the gearing to provide a 1:1 speed ratio drive between the turbine and the transmission output shaft with engine braking made available by this drive arrangement. The fourth and highest speed range drive is an overdrive and is provided by maintaining the clutched turbine drive to the carrier, disengaging the turbine drive to the first sun gear and engaging a brake that holds the second sun gear against rotation. For the shift from third to the fourth forward drive, there is provided a one-way clutch between the turbine and the second sun gear preventing runaway of this sun gear in the forward direction and thus preventing power interruption during the shift. In the fourth forward speed range drive with the turbine drive to the carrier and with the second sun gear held against forward rotation, the ring gear and connected transmission output shaft are driven in the forward direction at a speed greater than that of the turbine drive. Engine braking is made available in overdrive since the second sun gear is prevented from rotating in the reverse direction. The reverse drive is provided by engaging the brake that holds the carrier and engaging the clutch that connects the turbine to drive the second sun gear. Engine braking is made available in reverse drive since reverse rotation of the carrier is prevented.

An object of the present invention is to provide a new and improved transmission.

Another object is to provide in a transmission, planetary gearing having ring gear output, one sun gear which may be selectively input driven, another sun gear which may be selectively input driven or held, and a carrier which may be selectively input driven or held to provide four forward drives including an overdrive obtainable without power interruption and also a reverse drive.

Another object is to provide a transmission having a hydrodynamic torque converter and planetary gearing combined with three clutches, three brakes, two one-way brakes and a one-way clutch to provide four forward speed range drives including an overdrive and also provide a reverse drive.

Another object is to provide a transmission having a hydrodynamic torque converter and planetary gearing combined with three clutches, three brakes, two one-way brakes and a one-way clutch and having three selectively driven input members, two of which may be held, to provide four forward drives and reverse drive with engine braking available in each drive.

These and other objects of the invention will be more apparent from the following description and drawing in which:

A longitudinal sectional view of the preferred embodiment of the transmission according to the present invention is shown.

In the drawing there is shown a vehicle transmission generally comprising a hydrodynamic torque converter 10 and planetary gearing 12 all housed in a transmission housing 14. The transmission is operable to provide four forward drives, neutral and a reverse drive. The four forward drives are provided by two gear reduction drives, a direct drive and a geared overdrive.

Describing now the structural details, an engine driven housing 15 and connected impeller cover 16 rotate at engine speed and enclose a fluid chamber 17. Cover 16 drives through a sleeve 18, a pump drive gear 19 of an internal-external gear pump 20, the sleeve being welded to the cover and keyed to the gear as shown. Pump 20 is located in pump housing 21 which is bolted to a front bulkhead 22, the bulkhead being secured by the same bolts to transmission housing 14. Torque converter 10 includes a series of pump vanes 24 carried by cover 16, turbine vanes 25 carried by a turbine hub 26 and stator vanes 27 which are supported by a reaction hub 28 and disposed between the inner ends of the turbine and pump vanes. Stator vanes 27 and hub 28 are permitted free rotation in the same direction as the pump and turbine vanes, which direction is the forward direction, by a one-way brake 29 disposed between hub 28 and a ground sleeve 30 that is splined to bulkhead 22. One-way brake 29 prevents reverse rotation of stator vanes 27 under the influence of fluid in the converter. Turbine hub 26 is splined to the front end of a turbine shaft 32 which transmits the turbine drive to the gearing 12. Fluid is delivered to converter 10 from the pump 20 via a transmission control system pressure regulator valve, not shown, through a passage 33. Fluid is returned from the converter to the sump of pump 20 via ports 34 and 35 in turbine shaft 32 and a passage 36 which connects these ports, this passage being formed by a sleeve 37 fitted in a bore 38 of the turbine shaft.

A lockup clutch indicated generally at 40 is for connecting the transmission input to turbine shaft 32 through a mechanical path instead of through the hydraulic power path provided by converter 10 which is locked up by engagement of this clutch. Lockup clutch 40 comprises drive plates 41 which are connected by splines to a clutch housing 42 that is secured to housing 15. Plates 41 are adapted to engage driven plates 44 that are splined to turbine hub 26 and are thus connected to turbine shaft 32. A piston 45 forms with housing 42 a chamber 46 that is adapted to receive fluid under pressure to engage the lockup clutch. Fluid pressure may be admitted to chamber 46 through a port 48 and the bore 38 in turbine shaft 32.

Turbine shaft 32 is splined at its rear end to a clutch drum 50 in which is located three clutches indicated generally at 51, 52 and 54. Clutch 51 comprises drive plates 56 which are drivingly connected by splines to drum 50 and are adapted to engage driven plates 57 with reaction being taken by a plate 58 secured to drum 50. Driven plates 57 are drivingly connected by splines to a clutch hub 59 that is splined to the front end of a shaft 60. A piston 61 forms with an annular plate 62 a chamber 64 that is adapted to receive fluid under pressure to engage clutch 51. The plate 62 is mounted on hub 66 of the drum 50 which is supported at its front end for rotation on boss 67 of bulkhead 22. A release spring 69 biases piston 61 towards its clutch release position. Fluid pressure for engaging clutch 51 may be admitted to chamber 64 through passages 71 and 72 in drum 50 and turbine shaft 32, respectively.

The clutch 52 comprises drive plates 76 which are drivingly connected by splines to the drum 50. Drive plates 76 are adapted to engage driven plates 77 which are drivingly connected by splines to a clutch hub 78 that is splined to the front end of a sleeve shaft 80 surrounding shaft 60. A piston 81 forms with drum 50 a chamber 82 that is adapted to receive fluid under pressure to engage clutch 52, the force from piston 81 to the clutch plates 76 and 77 being delivered via a pin 84 to a pressure plate 86 of this clutch. Fluid pressure for engaging clutch 52 may be admitted to chamber 82 through passages 87 and 88 in piston 81 and drum 50, respectively. A release spring 89 biases piston 81 towards its clutch release position.

The clutch 54 comprises drive plates 90 which are drivingly connected by splines to a collar 91 that is splined to drum 50 and also serves as the backing plate for clutch 52. Drive plates 90 are adapted to engage driven plates 92 which are drivingly connected by splines to a sleeve shaft 94 surrounding shaft 80. A cylinder 96 is secured to shaft 94 and a piston 97 forms with shaft 94 and cylinder 96 a chamber 98 that is adapted to receive fluid under pressure to engage clutch 54. A spring 100 seated on backing plate 101 of this clutch biases the piston 97 towards its clutch release position, the reaction plate 101 being mounted on shaft 94. Fluid pressure may be admitted to chamber 98 to engage clutch 54 through a port 102 in shaft 94.

In addition to the selective connection provided by clutch 54 between drum 50 and shaft 94, there is provided a one-way clutch 104 whose outer race 106 is connected by a bell-shaped member 107 to drum 50. The inner race 108 of one-way clutch 104 is splined to shaft 94. The one-way clutch 104 may be of any suitable conventional type such as the roller type shown and operates to permit free backward rotation of shaft 94 relative to drum 50 and prevents forward rotation relative thereto.

The planetary gearing 12 has helical cut teeth and comprises a pair of annular sun gears 112 and 114, a ring gear 116, and a planet carrier assembly 118 carrying a short planet pinion 119 meshing with sun gear 112 and a long planet pinion 120 meshing with ring gear 116 and also meshing with the other sun gear 114. The carrier assembly 118 is splined to the rear end of shaft 60, the sun gear 112 is splined to the rear end of shaft 80, the other sun gear 114 is splined to the rear end of shaft 94 and the ring gear 116 is splined to a shaft 121 which is supported for rotation by the transmission housing 14 as shown and serves as the transmission's output. Carrier assembly 118 includes a drum 123 which is supported at its front side on a boss 124 of a rear bulkhead 125 which is splined to the transmission housing.

A band brake 126 grounded to the transmission housing 14 and operated by any suitable fluid pressure operated servo is adapted to engage drum 123. In addition to this selective holding of carrier 118, there is provided a one-way brake 127 whose outer race 128 is secured to drum 123 and whose inner race 129 is secured to rear bulkhead 125. The one-way brake 127 may be of any suitable conventional type such as the roller type shown and operates to prevent reverse rotation of carrier 118 and permit free forward rotation thereof.

A brake indicated generally at 130 is for holding sun gear 114 and comprises plates 131 which are connected by splines to the transmission housing. Plates 131 are adapted to engage plates 132 which are connected by splines to a hub 134 that is connected by splines to shaft 94 and is thus connected to sun gear 114. A piston 135 forms with the front side of bulkhead 125 and another piston 136 which is described in more detail later a chamber 137. Chamber 137 is adapted to receive fluid under pressure through a passage, not shown, in the bulkhead 125 to engage brake 130. A spring 138 biases piston 135 towards its brake release position.

The sun gear 114 may be selectively prevented from only reverse rotation by a brake indicated generally at 140 and a one-way brake 141 in series therewith. The brake 140 comprises plates 142 which are connected by splines to the transmission housing 14. Plates 142 are adapted to engage plates 144 which are connected by splines to the outer race 146 of the one-way brake 141. The inner race 108 of the one-way clutch 104 serves as the inner race of the one-way brake 141. The piston 136 forms with the front side of bulkhead 125 a chamber 150 that is adapted to receive fluid under pressure by a passage, not shown, in the bulkhead 125. The piston 136 has an axial extension 151 which extends past the plates of brake 130 to act on the pressure plate 152 of brake 140 to engage the latter. The one-way brake 141 which may be of any suitable conventional type such as the roller type shown operates when brake 140 is engaged to permit free forward rotation of sun gear 114 and prevent reverse rotation thereof.

The drive establishing clutches and brakes may be actuated by any suitable hydraulic control system and in a certain sequence. The following description illustrates the operation available.

For neutral, all of the clutches and brakes are released and no power from turbine shaft 32 which serves as the input to the gearing can be transmitted to output shaft 121.

The first and lowest speed range forward drive is established by engaging clutch 52. Power from the forwardly rotating turbine shaft 32 is delivered through the engaged clutch 52 to drive sun gear 112 forwardly. The carrier 118 tries to rotate backwardly but is prevented from doing so by one-way brake 127. The pinions 119 and 120 therefore are caused to rotate about their axes on the stationary carrier 118 with the long pinion 120 driving ring gear 116 and thus output shaft 121 in the forward direction and at reduced speed relative to the turbine driven sun gear 112.

In this first forward speed range drive, drive is at the reduction ratio thus provided by sun gear 112 and ring gear 116. Since one-way brake 127 permits forward rotation of carrier 118, power cannot be transmitted from the output shaft 121 to the converter's turbine 25 for engine braking and thus the output shaft can overrun when the vehicle is coasting. In the first forward speed range drive, the brake 126 may be engaged as an overrun brake to prevent forward rotation of carrier 118 to provide for engine braking.

The second and next higher speed range drive is established by retaining engagement of clutch 52, releasing brake 126 if it is engaged and engaging brake 140. Engaged brake 140 and the one-way brake 141 in series therewith prevent reverse rotation of sun gear 114. Power thus remains applied to sun gear 112, but now the other sun gear 114 is prevented from rotating backwardly, as it did in the first forward drive, by the operation of one-way brake 141. The gearing by compound action drives the ring gear 116 and thus output shaft 121 forwardly at a reduced speed in a speed range higher than that obtainable in the first forward drive. One-way brake 141 permits free forward rotation of sun gear 114 and thus power cannot be transmitted from the output shaft to the turbine for engine braking. In the second forward speed range drive, the brake 130 may be engaged as an overrun brake to prevent forward rotation of sun gear 114 to provide for engine braking.

The third and next higher speed range drive is established by maintaining engagement of clutch 52, releasing brake 130 if it is engaged, and engaging clutch 51. The brake 140 may remain engaged since one-way brake 141 permits the forward rotation of sun gear 114 that occurs on engagement of clutch 51. Since the sun gear 112 and carrier 118 are driven at the same speed, the gearing is locked up to provide a 1:1 speed ratio or direct drive to drive output shaft 121 in the forward direction. The brake 140 may remain engaged since one-way brake 141 permits the forward rotation of sun gear 114 that occurs in this drive. With the gearing thus locked up, engine braking is made available in this drive.

The fourth and highest speed range drive is established by maintaining engagement of clutch 51, releasing clutch 52 and engaging brake 130. As clutch 52 is released, the drive through engaged clutch 51 tries to increase the speed of sun gear 114 in the forward direction. On this occurrence, the one-way clutch 104 engages so that the sun gear 114 is prevented from speeding up in the forward direction relative to turbine shaft 32. The reaction for this prevention is transmitted back through engaged clutch 51 to carrier 118 of the gearing. This makes it possible to immediately release clutch 52 for an upshift to the fourth forward drive so that brake 130 can be engaged after clutch 52 has been completely released, the engagement of brake 130 then preventing forward rotation of the sun gear 114. Without one-way clutch 104, it would be necessary to time engagement of brake 130 to the release of clutch 52 to avoid power interruption. The turbine drive to carrier 118 causes the long pinion 120 to walk in the forward direction around the braked sun gear 114 resulting in the ring gear 116 and connected output shaft 121 being driven in the forward direction at a speed higher than the turbine driven carrier 118. With the brake 130 also preventing reverse rotation of sun gear 114, engine braking is made available in this overdrive.

The above sequential operation demonstrates how upshifts are effected. Downshifts are effected by reversing this order of operation. The lockup clutch 40 may be engaged at a predetermined transmission output speed to increase the transmission's efficiency and this may occur in each of the forward drives.

Reverse drive is obtained by engaging clutch 54 and brake 126. With carrier 118 held by brake 126, the turbine driven sun gear 114 drives long pinion 120 which in turn drives ring gear 116 and connected output shaft 121 in the reverse direction and at a reduced speed relative to the turbine driven sun gear 114. Engine braking is made available since reverse rotation of carrier 118 is prevented.

The four forward drives and one reverse drive thus made available make the transmission particularly suitable for use in a passenger car with the fourth forward drive, which is overdrive, providing for economical cruising operation. Furthermore, this transmission arrangement with its simple gearing provides the overdrive with an upshift that prevents power interruption.

The above described preferred embodiment is illustrative of the invention which may be modified within the scope of the appended claims.

I claim:

1. In a transmission the combination of an input member; an output member; planetary gearing having a first sun gear, a second sun gear, a ring gear, a carrier carrying a first planet pinion meshing with said first sun gear, said carrier also carrying a second planet pinion meshing with said first planet pinion, said second sun gear and said ring gear, said ring gear being connected to said output member; first clutch means for selectively connecting said input member to said first sun gear; second clutch means for selectively connecting said input member to said carrier; third clutch means for selectively connecting said input member to said second sun gear; first drive establishing means for selectively preventing rotation of said carrier in only one direction and, alternatively, in any direction; second drive establishing means for selectively preventing rotation of said second sun gear in only one direction and, alternatively, in any direction; and one-way clutch means for preventing rotation of said second sun gear relative to said input member when said first clutch means is disengaged while said second clutch means is engaged whereby a first forward speed range drive is provided on engagement of said first clutch means and operation of said first drive establishing means to prevent rotation of said carrier in at least one direction, a second forward speed range drive is provided on engagement of said first clutch means and operation of said second drive establishing means to prevent rotation of said second sun gear in at least one direction, a third forward speed range drive is provided on engagement of said first clutch means and said second clutch means, a fourth forward speed range drive is provided on engagement of said second clutch means and on operation of said second drive establishing means to prevent rotation of said second sun gear in at least one direction, and a reverse speed range drive is provided on engagement of said third clutch means and on operation of said first drive establishing means to prevent rotation of said carrier in at least one direction.

2. The transmission set forth in claim 1 and said first drive establishing means comprising one-way brake means for preventing rotation of said carrier in only one direction and brake means for selectively preventing any rotation of said carrier.

3. The transmission set forth in claim 1 and said second drive establishing means comprising brake means for selectively preventing any rotation of said second sun gear and additional brake means and one-way brake means in series with said additional brake means for selectively preventing rotation of said second sun gear in only one direction.

4. The transmission set forth in claim 1 and said first drive establishing means comprising one-way brake means for preventing rotation of said carrier in only one direction and brake means for selectively preventing any rotation of said carrier; said second drive establishing means comprising brake means for selectively preventing any rotation of said second sun gear and additional brake means and one-way brake means in series with said additional brake means for selectively preventing rotation of said second sun gear in only one direction.